Patented Mar. 25, 1941

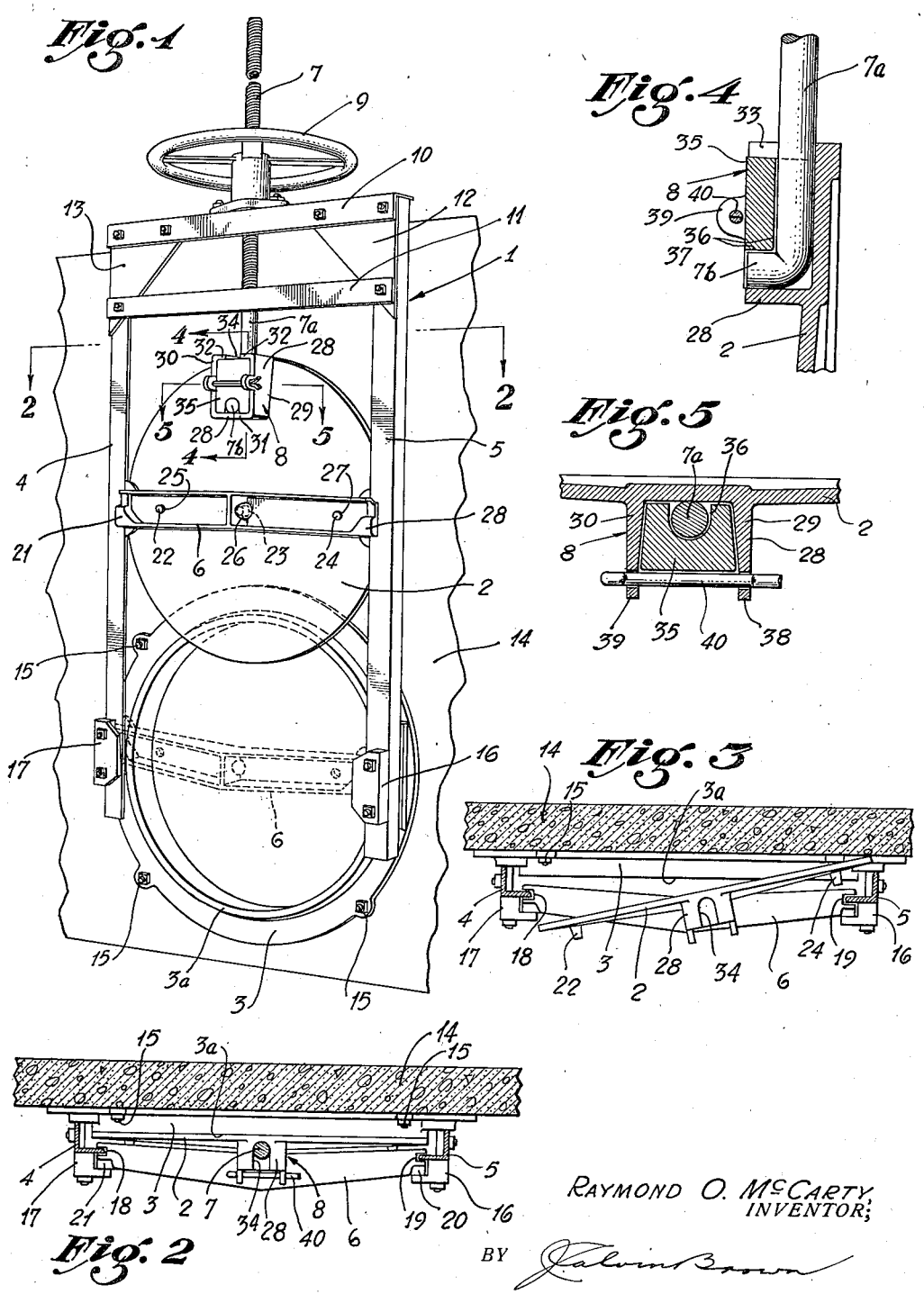

2,236,352

UNITED STATES PATENT OFFICE 2,236,352

CANAL AND DITCH GATE

Raymond O. McCarty, Los Angeles, Calif., assignor to Martin Iron Works, a corporation of California Application December 7, 1938, Serial No. 244,319

2 Claims. (Cl. 287—20.5)

This invention relates to improvements in gates generally, and specifically to canal and ditch gates, and has for an object the provision of a gate so formed and constructed as to permit the same to be readily removed from a frame without the necessity of disassembling the entire gate construction.

It is ordinary practice to provide gate valves wherein mechanism for operating the gate valve, together with the connections therefor, are so secured to the gate valve that in event of wear or trouble with the gate valve, a general shutting down for a period of time is necessary, to the end that the gate guides, so-called wedge bar, and the like, are completely disconnected. When it is realized that these gate valves may work at considerable depth within water, the operation of removing a gate valve entails considerable labor. The ills which gate valves are subjected to under high pressures consist usually in a cracking of the gate valve itself or a cracking of certain of the gate valve assembly, particularly around the guides. Then again, the gate valve may become worn by the character of the material that is passing through the valve, with the result that the gate valve will not properly seat. Any difficulty of this character requires a new gate valve.

It is ordinary practice to provide what is called a screw for raising and lowering the gate valve relative to its seat. It is the practice to reduce the size of the screw where it connects with the gate valve, and an object of the present invention is to so arrange the lifting mechanism for the gate valve as to not interfere with the strength or any of the parts.

Another object of the invention is to provide quick detachment means between the gate valve and the lifting screw which will permit the lifting screw to be readily disconnected from the gate valve within a minimum of time and to permit the gate valve to be swung to a position so that the gate valve may be removed, all other instrumentalities being intact.

With reference to the foregoing object, the advantages of such a construction will be immediately apparent to users of canal and ditch gates. In the first place, such construction will reduce purchasing costs as only the parts actually requiring replacement need be purchased. For example, a new gate valve may be readily placed in position with the same facility and ease as required for the removal of the old gate valve.

The present invention includes many refinements of construction which will be set forth in the body of the specification, and the present invention has for further objects a canal or ditch gate which is inexpensive in cost of manufacture, efficient in use, and generally superior to canal and ditch gates now known to the inventor.

With the above named and other objects in view, the invention consists in the novel and useful provision, formation, construction, association, and relative arrangement of parts, members and features, all as shown in the accompanying drawing, described generally, and more particularly pointed out in the claims.

In the drawing:

Figure 1 is a fragmentary perspective view of the improved canal and ditch gate shown in position of service, Figure 2 is a sectional view on the line 2—2 of Figure 1, Figure 3 is a fragmentary plan view showing the gate tipped for the purpose of removing the same, Figure 4 is an enlarged detail on the line 4—4 of Figure 1, and Figure 5 is an enlarged sectional detail on the line 5—5 of Figure 1.

Referring now with particularity to the drawing, the numeral 1 indicates one complete embodiment of the canal and ditch gate wherein 2 is a gate valve, 3 a ring including a valve seat, 4 and 5 frame members, 6 a wedge bar provided with elements engaging the two frame members for guiding movement of the wedge bar, 7 a lifting screw secured to means designated as an entirety by 8, carried by the gate 2, 9 a hand wheel provided with a lifting nut in engagement with the threads of the lifting screw 7, together with the means 10 and 11, comprising cross members between the frame members 4 and 5, and gussets 12 and 13 for bracing both the frame members and the cross members.

Where canal and ditch gates are employed, it is usual practice to fasten the frames to some wall, such as the concrete wall illustrated at 14, in any approved manner, and the ring 3 is positioned forwardly of some lateral; in the case of an orchard irrigating system, the main line leading to the front face of the said valve, to-wit, the face shown in Figure 1. This ring is provided with a machined valve seat 3ᵃ and the ring may be fastened in any suitable manner over the duct in the wall 14. In Figure 1, bolts are utilized, as shown at 15. The frames 4 and 5 are secured in any approved manner to the base of the ring 3. As is customary in devices of this character, the gate valve is adapted to be moved downwardly, the frames guiding its movement to finally position the gate valve over the valve seat 3ᵃ. In order to assure that the gate valve has tight engagement with its seat, wedge brackets 16 and 17 are provided. The wedge brackets have tapered inner faces, the construction being such that when the wedge bar 6 is received between said wedge brackets, the gate valve is brought into forcible engagement with the seat. The wedge bar, shown in Figure 3, is provided with two end grooves 18 and 19, within which grooves are received legs of the guide frames 4 and 5. It will be noted that the wedge bar is provided with enlargements 20 and 21, which tend to rock the wedge bar when received within the wedge brackets 16 and 17 to insure that the gate valve has an even distribution of cut-off pressure against the machined face of the valve seat. Furthermore, this construction assures proper stoppage of the wedge bar and gate valve in its downward movement when the gate valve is entirely seated.

The gate valve is provided on its outer surface with three spaced apart studs 22, 23 and 24, and the wedge bar 6 is provided with three openings 25, a socket central of the rear face of the wedge bar at zone marked 26, and 27 for receiving said studs, whereby the wedge bar and gate valve may be held in working relationship. Preferably, these studs are frusto-conical so that the studs may be readily removed from the openings in the wedge bar.

The screw shaft 7 has an unthreaded area 7a, this portion terminating in a bent end extremity 7b. Furthermore, the diameter of the unthreaded area including its extremity is not reduced but is equal to the diameter of the threaded area. The gate 2 is provided on its outer face and adjacent the rim thereof with a housing 28 forming a part of the means 8. This housing is in the form of a wall, the inner surface of a portion of which is tapered, particularly the taper is divergent outwardly from the outer face of the gate, as best illustrated in Figure 5, It is to be observed that this wall has two substantially parallel sides 29 and 30, an interconnecting piece 31 integral with the sides, and two inwardly disposed portions 32 and 33, not interconnected but providing a way or slot 34 therebetween. The sides 29 and 30 are tapered, the other sides being of equal thickness. Adapted to be received within the confines of the wall 28 is a block 35. This block has its side walls tapered to fit within the tapered sides 29 and 30. The block is provided with a longitudinally curved groove 36 and with a transversely curved groove 37 communicating with the groove 36. As shown in Figure 4, the unthreaded portion 7a of the shaft is adapted to be positioned within the way 34 of the wall 28 so that the bent end extremity 7b rests adjacent the inner surface of the side 31 of said wall. The block 35 is then positioned over the stem or shaft, as illustrated in Figures 4 and 5. In this regard, the portion 7a is received within the groove 36 of the block and the bent end extremity 7b is received within the opening 37. The sides 29 and 30 of the wall 28 are provided with aligned eye members 38 and 39, and a bolt, cotter key or other suitable means 40, is adapted to be passed through said eye members and to straddle the outer surface of the block. In this way, the block is held within the confines of the wall. The working fit between the shaft and the block is not tight, to the end that slight rocking motion may be secured therebetween, which allows the gate to rock slightly. In this connection, it is mentioned that the wedge bar has a loose fit engagement with the guides 4 and 5.

As shown in the drawing, the plane of the shaft 7 is diametrically disposed relative to the gate and the wall 28 receiving the block 35 has its center line (the block and wall) also evenly distributed on opposite sides of said diametric center line.

The operation, uses and advantages of the invention just described, are as follows:

Assuming that the frame members have been secured to the wall 14, with the ring 3 positioned relative to the intake opening leading to either a lateral or main line, through which liquid is passed, a revolving of the wheel 9 will raise or lower the shaft, dependent upon the rotation of said wheel, to in turn raise or lower the gate valve. If we assume that for some reason it is necessary to replace the gate valve, the gate valve may be raised to the full line position of Figure 1, and in such position it is possible for the operator to remove the key 40 from the eye members, to permit removal of the block 35 from the confining wall 28. When this occurs, the shaft may be moved upwardly, the bent end extremity 7b passing through the way 34 of the wall 28. The gate valve may now be tipped so as to remove the studs 22, 23 and 24 from the openings 25, 27 and the socket at 26 of the wedge bar, whereupon by lowering the wedge bar and tipping the gate valve to the position shown in Figure 3, the gate valve may be released from between the frame members 4 and 5. A new gate valve may replace the worn gate valve by a reversal of the operations just stated, to-wit, moving the gate valve inward between the frame members in the manner shown in Figure 3, whereupon the wedge bar may be brought into position for engagement with the studs by rocking the gate valve forwardly and replacing the shaft in position within the wall 28, inserting the block 35 and then securing the block by a key 40. The whole operation of removing an old gate valve and replacing it by a new one does not require more than five minutes of time.

I claim:

1. A quick detachment means for canal and ditch gates wherein is provided a disc valve and a lift screw therefor, comprising an open wall housing positioned adjacent the rim of the disc valve and on one face thereof, a block for reception within the confines of said wall housing, and means for maintaining the block within the housing; the relationship being such that the lift screw provided with a bent end extremity may be engaged by said block, the block in turn engaging the wall housing, whereby movement of the lift screw will produce movement of the disc valve.

2. A quick detachment means for canal and ditch gates, wherein is provided a disc valve and a screw lift therefor, comprising an open wall housing having a slotted top wall, a bottom wall, and inwardly tapered side walls, the said housing positioned adjacent the rim of the disc valve and on one face thereof; a block provided with tapered side walls and formed on one face with a lengthwise groove and on its bottom face with a transverse groove intersecting the lengthwise groove, the side walls of said housing provided with extended eye members, and means adapted to be passed through said eyes for maintaining said block within the open wall housing; the relationship being such that the lift screw provided with a bent end extremity may have its bent end received within the transverse groove of the block and the shank of the lift screw received in the lengthwise groove of said block, the shank otherwise passing through the slot in the upper wall of the housing.

RAYMOND O. McCARTY.